(12) United States Patent  (10) Patent No.: US 7,890,126 B2
Benco et al.  (45) Date of Patent: Feb. 15, 2011

(54) NETWORK SUPPORT FOR REMOTE SIGN CONTENT UPDATE

(75) Inventors: David S. Benco, Winfield, IL (US); Sanjeev Mahajan, Naperville, IL (US); Baoling S. Sheen, Naperville, IL (US); Sandra Lynn True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/141,102

(22) Filed: May 31, 2005

(65) Prior Publication Data

US 2006/0270424 A1  Nov. 30, 2006

(51) Int. Cl.
*H04W 4/00* (2009.01)

(52) U.S. Cl. .................. 455/466; 455/3.03; 455/410; 340/905; 382/104

(58) Field of Classification Search .................. 455/466, 455/3.03, 410; 705/14, 27; 340/905; 382/104
See application file for complete search history.

(56) References Cited

U.S. PATENT DOCUMENTS

| | | | |
|---|---|---|---|
| 3,079,587 A | 2/1963 | Barker | |
| 3,106,695 A | 10/1963 | Baltayan et al. | |
| 3,209,325 A | 9/1965 | Mentzer et al. | |
| 3,252,132 A | 5/1966 | Bolton | |
| 3,550,078 A | 12/1970 | Long | |
| 3,729,706 A | 4/1973 | Hein | |
| 3,732,558 A | 5/1973 | Justice | |
| 5,612,741 A * | 3/1997 | Loban et al. ................. | 348/383 |
| 5,864,305 A | 1/1999 | Rosenquist | |
| 5,900,826 A | 5/1999 | Farber | |
| 5,986,576 A | 11/1999 | Armstrong | |
| 6,052,067 A | 4/2000 | Nuxoll | |
| 6,064,318 A | 5/2000 | Kirchner, III et al. | |
| 6,072,407 A | 6/2000 | Shin | |
| 6,104,313 A | 8/2000 | Boyd, III | |
| 6,118,388 A | 9/2000 | Morrison | |
| 6,147,623 A | 11/2000 | Rippen | |
| 6,317,108 B1 | 11/2001 | Kalt | |
| 6,366,219 B1 | 4/2002 | Hoummady | |
| 6,393,270 B1 * | 5/2002 | Austin et al. ................. | 455/411 |
| 6,920,332 B2 * | 7/2005 | Ala-Luukko ................. | 455/466 |
| 2002/0007245 A1 | 1/2002 | Olindo et al. | |
| 2002/0116717 A1 * | 8/2002 | Eller et al. ................... | 725/105 |
| 2003/0028430 A1 * | 2/2003 | Zimmerman ................. | 705/14 |
| 2003/0164753 A1 | 9/2003 | Gongolas | |
| 2004/0128891 A1 | 7/2004 | Keach | |
| 2005/0021393 A1 * | 1/2005 | Bao et al. ..................... | 705/14 |
| 2005/0097195 A1 * | 5/2005 | Wang et al. ................. | 709/221 |

(Continued)

OTHER PUBLICATIONS

Website pages from http://www.cleveland.com, Harry J. Gomez, "New Billboards Provide Side-of-the-Road Show", The Plain Dealer (5 pages) (printed May 12, 2005).

*Primary Examiner*—Nghi H Ly
(74) *Attorney, Agent, or Firm*—Fay Sharpe LLP

(57) ABSTRACT

A system and method are provided for provisioning network support to allow an authorized mobile subscriber to update message content of a remote signage system having variable content capabilities such as an electronic road sign or the like. The authorized subscriber does so by transmitting a text message, which is processed by the network and provided to the sign as content for display.

17 Claims, 4 Drawing Sheets

U.S. PATENT DOCUMENTS

| | | | |
|---|---|---|---|
| 2005/0114703 A1* | 5/2005 | Allen et al. | 713/201 |
| 2005/0171788 A1* | 8/2005 | Shah et al. | 705/1 |
| 2005/0220134 A1* | 10/2005 | Lin | 370/437 |
| 2005/0254443 A1* | 11/2005 | Campbell et al. | 370/310 |
| 2006/0129451 A1* | 6/2006 | Kohanim et al. | 705/14 |

* cited by examiner

| SIGN ID /20-1 | AUTHORIZED SUBSCRIBERS /20-2 |
|---|---|
| 216-XXX-YYYY | 216-AAA-BBBB |
| | 216-CCC-DDDD |
| | 216-EEE-FFFF |
| | 216-GGG-HHHH |
| 216-JJJ-KKKK | 216-LLL-MMMM |
| ⋮ | ⋮ |

20

NETWORK SUPPORT FOR REMOTE SIGN CONTENT UPDATE

BACKGROUND OF THE INVENTION

This invention relates to a method and apparatus for providing network support for remote sign content update. In particular, the present development is directed to provisioning network support to allow an authorized mobile subscriber to update message content of a remote signage system having variable content capabilities such as an electronic road sign, or the like. The authorized subscriber does so by transmitting a text message which is processed by the network and provided to the sign as content for display.

While the invention is particularly directed to the art of network support for remote sign content update, and will be thus described with specific reference thereto, it will be appreciated that the invention may have usefulness in other fields and applications. For example, the invention may be used in other situations where remote transmission of text messages to a variable display is desired.

By way of background, there may be large numbers of portable, variable content display, electronic signs in use at any one time in a given municipality. These signs may include road repair signs, traffic signs, parking signs, ... etc. Updating the content of such signs may be inconvenient and time consuming because, typically, a person must be physically present at the sign location to input, deactivate or change the message or content that is displayed.

Other signs are known in the art which are controlled by remote methods. For example, U.S. Pat. No. 6,064,318 relates to an automated data acquisition and processing-of-traffic-information-in-real-time system and method. However, this system does not disclose a convenient manner for sign content update through use of text messaging and a wireless network.

Likewise, a known system used in connection with digital billboards in various municipalities utilizes an on-board computer, and a high speed internet connection, such as a Digital Subscriber Line (DSL) connection. A command center is able to program an advertisement and sends it to billboards so that the billboards can display advertisements simultaneously. Each advertisement appears for a predetermined amount of time. The system allows for customization, depending on the time of day or day of the week. However, this system likewise does not disclose the practical use of the wireless system (or text or short messaging) to conveniently update sign content.

U.S. Pat. No. 6,317,108, relating to an electrostatic video display drive circuitry, discloses use of a modem and a telephone network to control an electrostatic video display. However, this patent does not disclose or suggest that text messaging (or short messaging) technology be used to provide sign content update.

As such, there is a need and a desire to provide for convenient updating of variable content on various signage systems, such as traffic and road signs.

The present invention contemplates a new and improved technique that resolves the above-referenced difficulties and others.

SUMMARY OF THE INVENTION

A method and apparatus for remotely providing content to a sign are provided.

In one aspect of the invention, a method comprises transmitting the content of the sign by a user through the wireless network, the content being transmitted as a text message, receiving the text message by the wireless network, determining by the wireless network whether the user is a valid subscriber, determining by the wireless network whether the valid subscriber is authorized to provide the content to the sign, transmitting the text message to the sign by the wireless network if the valid subscriber is authorized to provide the content to the sign, receiving the text message by the sign and displaying the text message by the sign.

In another aspect of the invention, the wireless network comprises a switching module operative to receive the text message and selectively transmit the text message based on the determining steps.

In another aspect of the invention, the switching module is a mobile switching center.

In another aspect of the invention, the determining whether the user is a valid subscriber comprises accessing a subscriber database.

In another aspect of the invention, determining whether the valid user is authorized comprises accessing a billboard database.

In another aspect of the invention, the method further comprises storing the text message by the sign in a memory location.

In another aspect of the invention, the display of the text message comprises accessing the memory location to retrieve the text message.

In another aspect of the invention, a system comprises a means for transmitting the content of the sign by a user through the wireless network, the content being transmitted as a text message, a means for receiving the text message, a means for determining whether the user is a valid subscriber, a means for determining whether the valid subscriber is authorized to provide the content to the sign, a means for transmitting the text message to the sign if the valid subscriber is authorized to provide the content to the sign, a means for receiving the text message by the sign and a means for displaying the text message by the sign.

In another aspect of the invention, the system further comprises a subscriber database.

In another aspect of the invention, the system further comprises a billboard database.

In another aspect of the invention, the system further comprises means for storing the text message in a memory location.

In another aspect of the invention, the system further comprises means for accessing the memory location to retrieve the text message.

In another aspect of the invention, a system comprises a switching module operative to receive a text message from a user, determine whether the user is a valid subscriber to a sign update service, determine whether the valid subscriber is authorized to provide the text message to the sign and transmit the text message to the sign by the wireless network if the valid subscriber is authorized to provide the content to the sign, and a receiving module operative to receive the text message and display the text message as sign content.

In another aspect of the invention, the switching module is a mobile switching center.

In another aspect of the invention, the system further comprises a subscriber database having information stored therein relating to whether the user is a valid subscriber.

In another aspect of the invention, the system further comprises a billboard database having information stored therein relating to whether a valid subscriber is authorized to provide content to a sign.

In another aspect of the invention, the receiving module is housed on the sign.

In another aspect of the invention, the sign is operative to display the text message.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
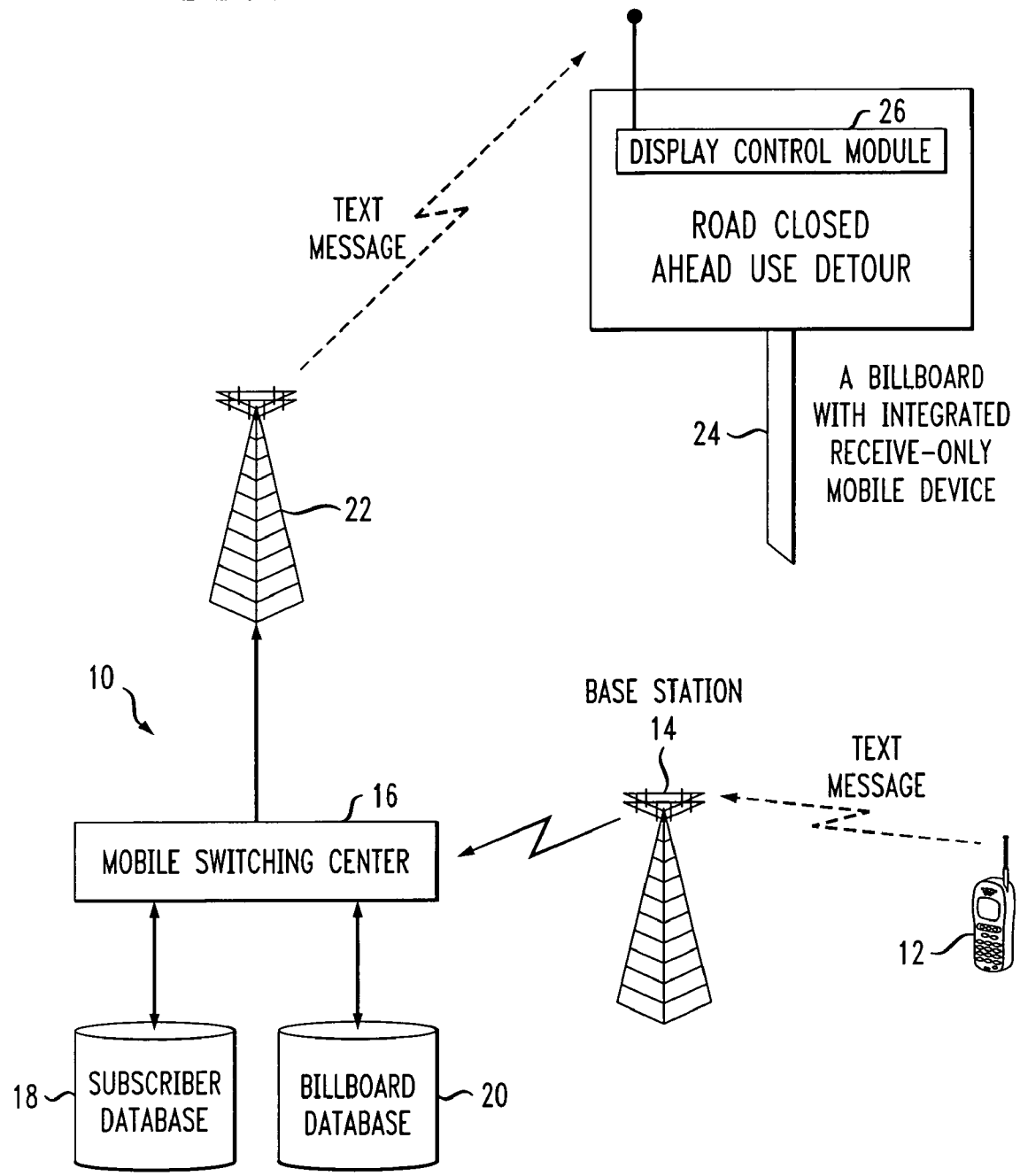
FIG. 1 is an illustration of a network into which the present invention may be incorporated.

Referring now to the drawings wherein the showings are for purposes of illustrating the preferred embodiments of the invention only and not for purposes of limiting same, FIG. 1 provides a view of a network into which the present application may be incorporated. As shown, a telecommunications network 10 is accessed by a user through a mobile device 12. The mobile device 12 is operative to send text messages (or short messages) into the network through a base station 14. The text message is ultimately received by a switching module such as a mobile switching center (MSC) 16. The mobile switching center (MSC) 16 has access to a subscriber database 18 and a billboard database 20. The mobile switching center (MSC) 16 also is capable of communicating with other network components such as a base station 22, Which is in the vicinity of a road sign 24 for which variable content is provided. A display control module 26 is provided to the sign 24.

It should be understood that the network 10 is merely an example of a network configuration into which the present invention may be incorporated. This network 10 may take a variety of forms to accommodate the present invention. Notably, any network to implement the present invention will, in at least one form, accommodate text messaging from a mobile device, such as the mobile device 12, and be able to communicate with a signage system, such as sign 24, onto which the text message will be displayed. With respect to text messaging, it should be understood that alternative messaging techniques, such as short messaging, may also be used.

It should be further understood that the mobile device 12 may take a variety of forms. For example, the mobile device 12 may be a wireless phone, a personal digital assistant (PDA), a personal computer, or the like. In the context of the present invention, these devices will possess the requisite capability of transmitting text messages, or short messages.

Likewise, the base stations 14 may take a variety of forms, as is known in the art. In addition, the base stations 14 may also differ in operation and configuration as a function of the generation of technology that is implemented in a particular network. As such, the base station devices 14 may actually take the form of different devices that are substantially comparable in functionality to base stations in a particular technology.

Figure 2:
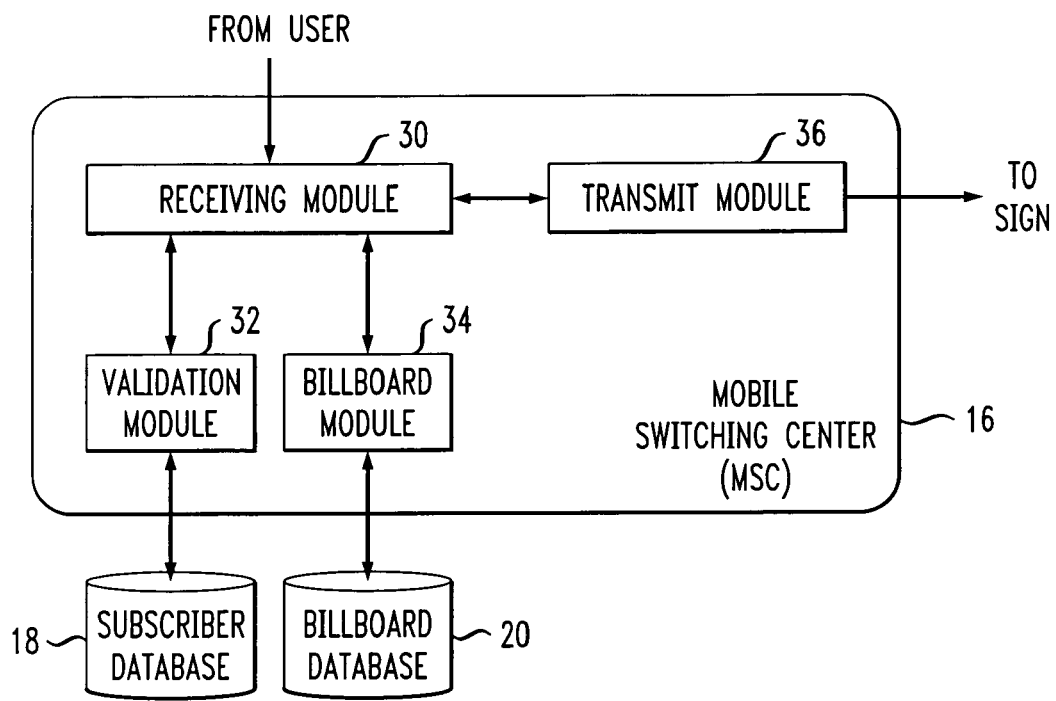
FIG. 2 is an illustration of a switching module according to the present invention.

With reference now to FIG. 2, the mobile switching center (MSC) 16, in one form, is illustrated. As shown, the mobile switching center (MSC) 16 includes a receiving module 30, a validation module 32 and a billboard module 34. The validation module 32 communicates with the subscriber database 18. The billboard module 34 communicates with the billboard database 20. As will be apparent from the process below, the receiving module 30 ultimately communicates with a transmission module 36 which is able to provide the text message to its destination, e.g., the sign.

Figure 3:
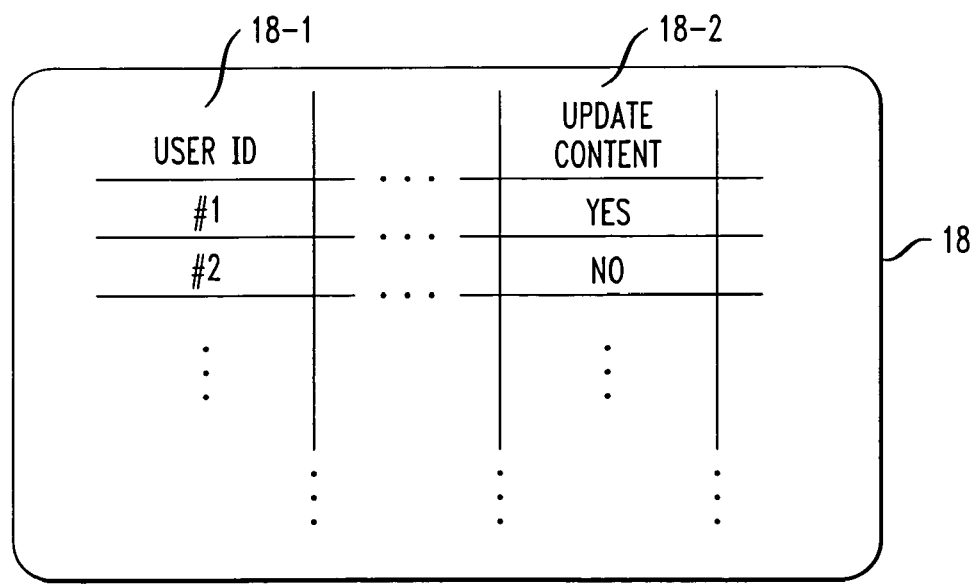
FIG. 3 is an illustration of a subscriber database according to the present invention.

In operation, the mobile switching center (MSC) 16 receives data from a user at the receiving module 30. It is within the receiving module 30 that a determination is made as to whether a text message (or other alternative messaging format or simply a text messaging request) has been received. If a text message (or request) has not been received, then normal processing of the call takes place. Such normal processing, for the sake of brevity, will be omitted. Likewise, a description of the elements within the mobile switching center (MSC) 16 that are dedicated to those functions will be omitted. However, if a text message (or request) is received, a determination is made as to whether the user is a valid subscriber to the contemplated sign update service. In this regard, a separate list could be stored within the mobile switching center (MSC) 16 to determining the user's identity and whether the user is a subscriber. Alternatively, a separate field can simply be provided within the subscriber database 18 (as shown in FIG. 3) to indicate whether a particular text messaging user is a valid subscriber. Next, a determination is made as to whether the valid subscriber is authorized to provide the text message to a subject sign. Again, as will be detailed below, this information may be provided in the billboard database 20, wherein data fields are provided to identify the users that are authorized to update particular signage systems. It should be appreciated that, although separate databases, e.g., the subscriber database 18 and the billboard database 20, are illustrated, the information may alternatively be stored in a single database or distributed throughout a plurality of databases in various configurations. This, of course, will depend on the system design and requirements of the network.

After determining that a valid subscriber is authorized to provide content to a particular sign, the mobile switching center (MSC) 16, through the transmit module 36, transmits the received text message to the sign through the wireless network 10. If a request for text messaging triggered the present functionality, the mobile switching center (MSC) 16 will prompt the user for a text message before it sends the text message.

It should be appreciated that the mobile switching center (MSC) 16 may comprise a multitude of other elements and functionality to accommodate typical functions within the network. As such, all such elements and functionality have not been described herein. Moreover, the mobile switching center (MSC) 16 may take the form of any type of switching module that is used in a network, as a function of the network configuration and the generation of technology that are implemented. In this regard, while the mobile switching center (MSC) 16 may take the form of another type of switching module, it will maintain the described functionality to implement the invention.

With reference now to FIG. 3, an example form of the subscriber database 18 is shown. Although it is understood that the subscriber database 18 will include a variety of fields and forms of data, with respect to the present invention, relevant fields include a user identification field 18-1 and an update service field 18-2. This information indicates whether the user is a subscriber to the content update service contemplated herein.

It should be understood that the subscriber database 18 may take a variety of different forms. Indeed, as noted above, the subscriber database 18 may also include the information that is maintained within the billboard database 20. In any case, those skilled in the art will have an understanding of a suitable implementation for elements to maintain this information as a function of the network design and implementation.

Figures 4, 5:
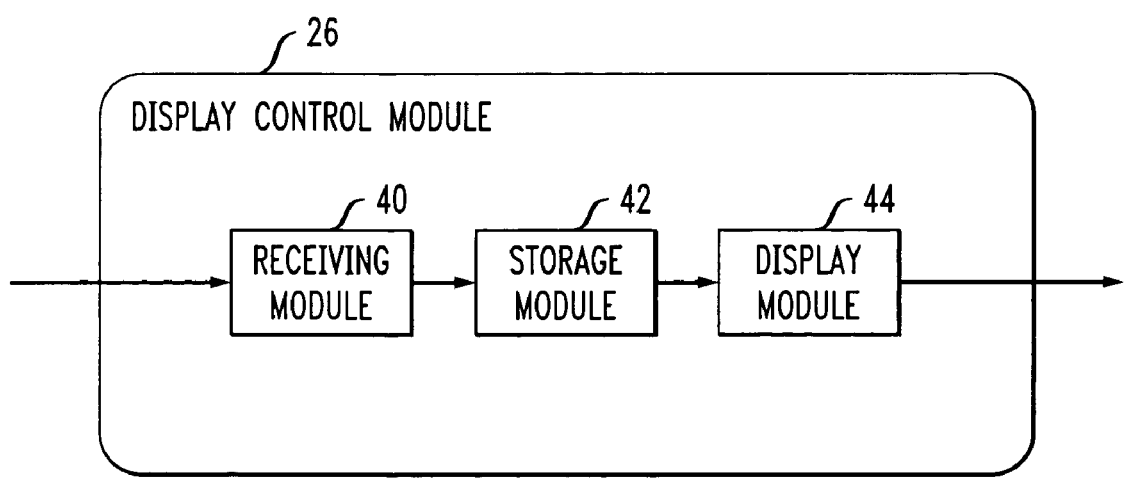
FIG. 4 is an illustration of a database according to the present invention.
FIG. 5 is an illustration of a control module according to the present invention.

With reference now to FIG. 4, a billboard database 20 is illustrated. This database 20 may take a variety of forms but, as shown, it includes a listing 20-1 of various phone numbers for the various billboards that are capable of being updated in the manner contemplated herein. The database 20 also includes, for each identified billboard, a field 20-2 for the subscribers who are authorized to change their content. Both of these fields of information are the phone numbers of the users and/or signs. Of course, other types of identification fields may be used as an alternative.

With reference now to FIG. 5, the display control module 26 of the sign 24 is illustrated. Initially, it should be understood that the sign 24 may take a variety of forms. In this regard, the sign 24 may be a traffic sign, a parking sign, a construction sign, a billboard, or the like. Any type of display system providing variable content display that may require updating or altering may incorporate the features of the present invention. The control module 26 includes a receiving module 40, a storage module 42, and a display module 44.

In operation, the receiving module 40 receives the text message from the network, e.g., the mobile switching center (MSC) 16 and stores the message in a memory location within the storage module 42. The display module 44 then retrieves the text message from the memory location of the storage module 42 and displays the text message on the display of the sign 24. It should be understood that a variety of different software routines and hardware configurations may be implemented to accomplish these tasks. For example, a module may be implemented as having the dual function of storing and also displaying the text message. In addition, as shown, the control module 26 is illustrated as being housed on the sign 24. However, the control module may be simply provided in a location to communicate with the sign 24.

Figure 6:
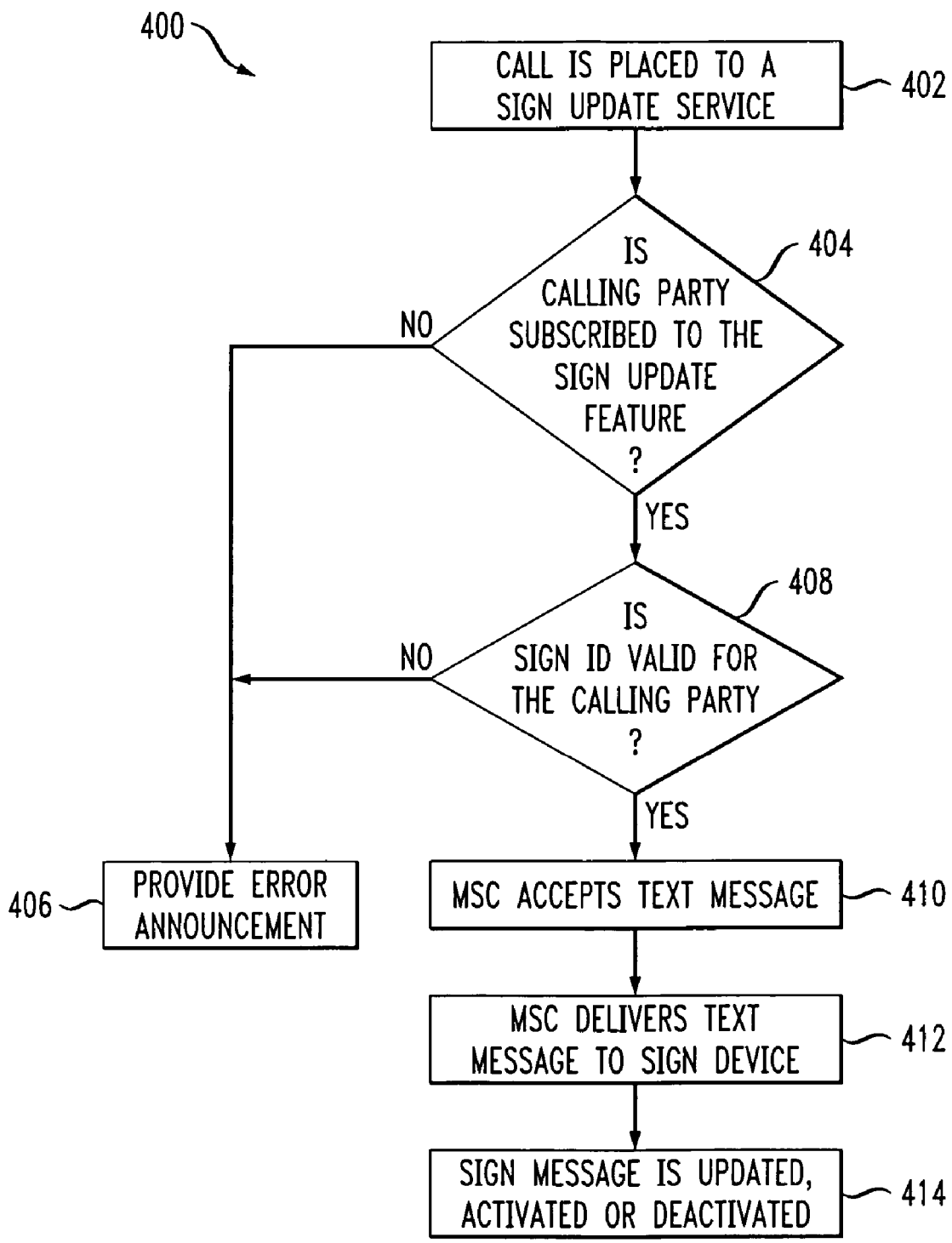
FIG. 6 is a flowchart illustrating a method according to the present invention.

With reference now to FIG. 6, a method 400 according to the present invention is illustrated. It should be understood that this method may be implemented using a variety of hardware configurations and software techniques. For example, the software code may be implemented in a distributed fashion (e.g., in the mobile switching center (MSC) 16 and the control module 26) or in a centralization fashion.

As illustrated, a call is placed to initiate a sign update service by a user (at 402). To do so, a text message may be sent or a request for service may be sent to the mobile switching center (MSC) 16. The mobile switching center (MSC) 16, as described above, recognizes the text message or the request. A determination is first made as to whether the user is a subscriber to the sign update feature (at 404). In one form, the subscriber database 18 is accessed to do so. If not, an error announcement is provided (at 406). If the user is a valid user, a determination is then made as to whether the user is authorized to update the content of the subject sign (at 408). The billboard database 20 is accessed to accomplish this task on one example embodiment. If the user is not so authorized, an error announcement is likewise provided (at 406). If, however, the user is a valid user of the sign update service and is authorized to update the subject sign, the text message is accepted by the mobile switching center (MSC) 16 (at 410). If only a request for service was sent by the user, however, the mobile switching center (MSC) 16 will provide the user with an opportunity to enter the text message before it is accepted. The message is then delivered to the sign (at 412). Known text messaging functionality may be implemented to so deliver the text message. Upon receiving the text message, the sign 24 changes the content of the displayed information (at 414). To accomplish this, the control module 26 is implemented to receive the text message in the receiving module 40 and, through the storage module 42 and display module 44, display the text message as sign content. As noted above, this may be accomplished in a variety of different manners, depending on the architecture of the sign.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for remotely providing content to a sign through a wireless telecommunications network, the method comprising:
   receiving, by the wireless network, a text message from a user, wherein the text message comprises content of the sign;
   determining by the wireless network whether the user is a valid subscriber based on by accessing subscriber information stored in a subscriber database, wherein the subscriber information comprises at least one user identification field and at least one corresponding update service field;
   determining by the wireless network whether the valid subscriber is authorized to provide the content to the sign by accessing authorization information stored in a billboard database, wherein the authorization information comprises at least one field that indicates whether the valid subscriber is authorized to provide content to the sign;
   transmitting the text message to the sign by the wireless network if the valid subscriber is authorized to provide the content to the sign;
   receiving and storing the text message by the sign; and,
   displaying the text message by the sign.

2. The method as set forth in claim 1 wherein the wireless network comprises a switching module operative to receive the text message and selectively transmit the text message based on the determining steps.

3. The method as set forth in claim 2 wherein the switching module is a mobile switching center.

4. The method as set forth in claim 1 wherein the storing comprising storing the text message by the sign in a memory location.

5. The method as set forth in claim 4 wherein the display of the text message comprises accessing the memory location to retrieve the text message.

6. A system for remotely providing content to a sign through a wireless network, the system comprising:
  a means for receiving a text message from a user, wherein the text message comprises content of the sign;
  a means for determining whether the user is a valid subscriber by accessing subscriber information stored in a subscriber database, wherein the subscriber information comprises at least one user identification field and at least one corresponding update service field;
  a means for determining whether the valid subscriber is authorized to provide the content to the sign by accessing authorization information stored in a billboard database, wherein the authorization information comprises at least one field that indicates whether the valid subscriber is authorized to provide content to the sign;
  a means for transmitting the text message to the sign if the valid subscriber is authorized to provide the content to the sign;
  a means for receiving the text message by the sign;
  a means for storing the text message by the sign; and,
  a means for displaying the text message by the sign.

7. The system as set forth in claim 6 wherein the means for storing the text message by the sign uses a memory location.

8. The system as set forth in claim 7 further comprising means for accessing the memory location to retrieve the text message.

9. A system comprising:
  a switching module operative to receive a text message from a user, determine whether the user is a valid subscriber to a sign update service by accessing subscriber information stored in a subscriber database, wherein the subscriber information comprises at least one user identification field and at least one corresponding update service field, determine whether the valid subscriber is authorized to provide the text message to the sign by accessing authorization information stored within a billboard database, wherein the authorization information comprises at least one field that indicates whether the valid subscriber is authorized to provide content to the sign and transmit the text message to the sign if the valid subscriber is authorized to provide the content to the sign; and,
  a receiving module operative to receive the text message and display the text message.

10. The system as set forth in claim 9 wherein the switching module is a mobile switching center in a wireless telecommunications network.

11. The system as set forth in claim 9 wherein the receiving module is housed on the sign.

12. The system as set forth in claim 9 wherein the sign is operative to display the text message.

13. A method for remotely providing content to a sign through a wireless telecommunications network, the method comprising:
  receiving, by the wireless network, a text message from a user, wherein the text message comprises content of the sign;
  determining by the wireless network whether the user is a valid subscriber by accessing subscriber information stored in a subscriber database, wherein the subscriber information comprises at least one user identification field and at least one corresponding update service field;
  determining by the wireless network whether the valid subscriber is authorized to provide the content to the sign by accessing authorization information stored within a billboard database, wherein the authorization information comprises at least one field that indicates whether the valid subscriber is authorized to provide content to the sign.

14. The method as set forth in claim 13, further comprising receiving and storing the text message by the sign.

15. The method as set forth in claim 14, further comprising displaying the text message by the sign.

16. A system comprising:
  a switching module operative to receive a text message from a user, determine whether the user is a valid subscriber to a sign update service by accessing subscriber information stored in a subscriber database, wherein the subscriber information comprises at least one user identification field and at least one corresponding update service field, determine whether the valid subscriber is authorized to provide the text message to the sign by accessing authorization information stored within a billboard database, wherein the authorization information comprises at least one field that indicates whether the valid subscriber is authorized to provide content to the sign and transmit the text message to the sign if the valid subscriber is authorized to provide the content to the sign.

17. The system of claim 16, further comprising a receiving module operative to receive the text message and display the text message.

* * * * *